United States Patent [19]
Avila et al.

[11] Patent Number: 5,218,361
[45] Date of Patent: Jun. 8, 1993

[54] INTERFEROMETER AMBIGUITY RESOLUTION USING MISSILE ROLL

[75] Inventors: Louis J. Avila, Costa Mesa; Joseph S. Kaufmann, Irvine; C. Web Westerman, El Toro, all of Calif.

[73] Assignee: Loral Aerospace Corporation, New York, N.Y.

[21] Appl. No.: 815,322

[22] Filed: Dec. 27, 1991

[51] Int. Cl.$^5$ .............................................. G01S 5/02
[52] U.S. Cl. .................................. 342/430; 342/424; 342/442; 342/449
[58] Field of Search ............... 342/430, 424, 442, 449, 342/156

[56] References Cited
U.S. PATENT DOCUMENTS
5,053,784 10/1991 Hippelainen ...................... 342/434

Primary Examiner—Theodore M. Blum
Attorney, Agent, or Firm—Anthony W. Karambelas

[57] ABSTRACT

Apparatus and methods of achieving accurate, unambiguous angle information with a minimum number of antenna elements. The present invention resolves the ambiguities inherent in a long baseline phase interferometer by employing a minimum number of antennas to form shorter baselines. The present invention employs roll motion (antenna rotation) to reorient interferometer baselines and a signal processor to measure the roll angle. Taking interferometer phase data with at least two orientations of the interferometer baselines permits resolution of the ambiguities. This also allows the use of long antenna baselines thereby achieving high angular accuracy with angle ambiguities resolved using only two antenna elements per spatial angle. This reduces system complexity and reduces the required clear aperture area, factors of great significance in missile systems. The invention takes phase data at two or more interferometer baseline orientations and forms a set of simultaneous equations involving the phase ambiguities. These equations are solved to produce unambiguous target direction vectors. The interferometer may employ four antennas to obtain maximum accuracy angle data unambiguously and simultaneously in both azimuth and elevation. However, three antennas may also be used with some loss in angle accuracy.

10 Claims, 3 Drawing Sheets

INTERFEROMETER AMBIGUITY RESOLUTION USING MISSILE ROLL

BACKGROUND

The present invention relates generally to interferometers, and more particularly, to an apparatus and method for providing unambiguous angle measurements simultaneously in azimuth and elevation in such interferometers using a minimum number of antenna elements.

Prior art in the area of resolving unambiguous angle information in interferometers may be found with reference to the following patents. U.S. Pat. Nos. 3,697,997 and 3,740,002 show simple two antenna (for each axis) interferometers. They are incapable of resolving angle ambiguities when antenna elements are farther apart than ½ wavelength of the received signal. This severely limits their angle accuracy since angle accuracy improves with antenna separation.

U.S. Pat. No. 4,170,774 uses amplitude to resolve the angular ambiguities associated with a phase interferometer. To obtain good amplitude performance requires high antenna gain and a corresponding reduction in the interferometer's field of view. Also, the antenna elements must be squinted away from each other which reduces the accuracy of the phase interferometer since the antenna elements must operate further off their boresight to cover a given field of view.

U.S. Pat. No. 4,540,139 addresses the problem of detecting any polarization with an interferometer using linearly polarized receiving elements. Most current systems that detect signals with various polarizations use circularly polarized antenna elements. This patent uses two antenna elements per baseline and is incapable of resolving angular ambiguities for long antenna element separations. This limits its angular accuracy as noted above for U.S. Pat. Nos. 3,697,997 and 3,740,002. U.S. Pat. Nos. 4,638,320 and 4,639,733 are interferometer systems using more than two antenna elements per spatial angle to achieve high angular resolution and resolve angular ambiguities.

Wide frequency coverage interferometers require broadband antenna elements whose diameter is determined by the lowest frequency that must be received. The size of the antenna element limits the center to center spacings of the elements to approximately ½ a wavelength at the lowest frequency of interest. Thus, at higher frequencies of interest, the interferometer based on two closely spaced antenna elements is ambiguous in angle. The present invention is adapted to resolve these ambiguities.

Thus it is an objective of the present invention to provide for apparatus and methods that provides for simultaneous unambiguous angle measurements in azimuth and elevation in an interferometer using a minimum number of antenna elements.

SUMMARY OF THE INVENTION

In order to achieve the above and other objectives, the present invention provides for a means and method of achieving accurate, unambiguous angle information with a minimum number of antenna elements. The present invention provides for apparatus and methods of resolving the ambiguities inherent in a long baseline phase interferometer without employing multiple antennas to form shorter baselines. The present invention employs roll motion to reorient interferometer baselines; a receiver that measures the phase differences between interferometer antenna elements and measures the frequency of the received signals; and a digital signal processor to determine bearing to a transmitting antenna. Taking interferometer phase data with at least two orientations of the interferometer baselines permits resolution of ambiguities.

The present invention uses spatial changes in the antenna element orientation due to rotating (rolling) of the interferometer antenna array (missile) to resolve the angular ambiguities. This allows the use of long antenna baselines thereby achieving high angular accuracy with angle ambiguities resolved using only two antenna elements per spatial angle. This reduces system complexity and reduces the required clear aperture area, factors of great significance on missile systems.

The method of resolving the ambiguity involves taking phase data at two or more interferometer baseline orientations and forming a set of simultaneous equations involving the phase ambiguities. These equations assume that the number of ambiguities passed through in going from one baseline orientation to the next has been determined. This is possible measuring the phase difference between antennas at an update rate which is sufficient to limit the changes in phase (resulting from rotation of the antenna array) to less than 180° between updates (typically 150°).

In missile systems such as a HARM (High Speed Anti-Radiation Missile) missile system, for example, missile roll reorients the interferometer baselines. The missile's guidance system controls missile roll orientation and uses rate gyros coupled to intergrators to measure the roll angles. For applications without an external source of rotation control and measurement, the interferometer antenna array may be attached to a rotatable shaft driven by a motor controlled by the digital signal processor.

An interferometer on the HARM missile system thus may use four antennas, for example, to obtain maximum accuracy angle data unambiguously and simultaneously in both azimuth and elevation. However, three antennas may also be used with some loss in angle accuracy. The baselines using three antennas equally spaced (an equilateral triangle) is about 13 percent shorter than those using four antennas.

In comparison to U.S. Pat. Nos. 3,697,997 and 3,740,002, for example, the present invention resolves the angle ambiguities even when long antenna separations are employed, allowing high angular accuracy to be achieved. In comparison to U.S. Pat. No. 4,170,774, for example, the present invention resolves ambiguities on the basis of phase changes induced by rotation of the interferometer array.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
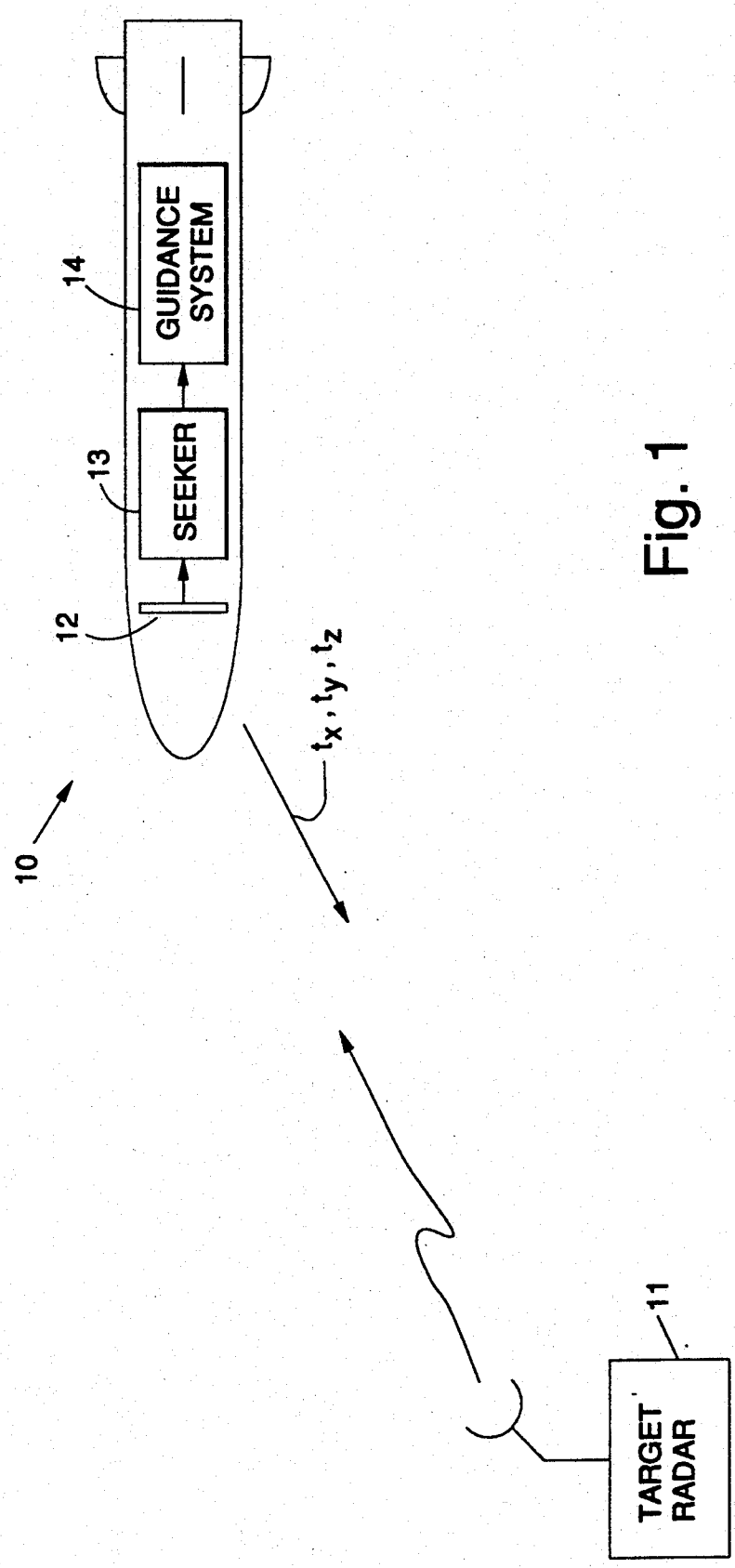
FIG. 1 shows a guided missile system incorporating an interferometer and associated signal processing in accordance with the principles of the present invention.

Referring to the drawing figures, FIG. 1 shows a guided missile system 10 incorporating an interferometer 12 and associated signal processing located in a seeker 13 in accordance with the principles of the present invention. The missile system 10 is shown to be illuminated by energy emanating from a target radar 11. The missile system 10 may comprise a four antenna interferometer 12, for example, that may be employed in a HARM missile, for example. The details of the four antenna interferometer 12 are shown in FIG. 3. The missile system 10 also comprises the seeker 13 that is coupled to receive output signals from the four antenna interferometer 12, and a guidance system 14 coupled to receive output signals from the seeker 13 and that is adapted to guide the missile system 10 toward the target radar 11 and control rotational movement of the interferometer 12 as will be described below. The missile system 10 is guided along a direction defined by a unit vector $(t_x, t_y, t_z)$, $(t_x, t_y, t_z$ are commonly referred to as direction cosines), that are generated by the interferometer 12 and a digital signal processor in the seeker 13 using the principles of the present invention, as will be described in more detail below.

Figure 2:
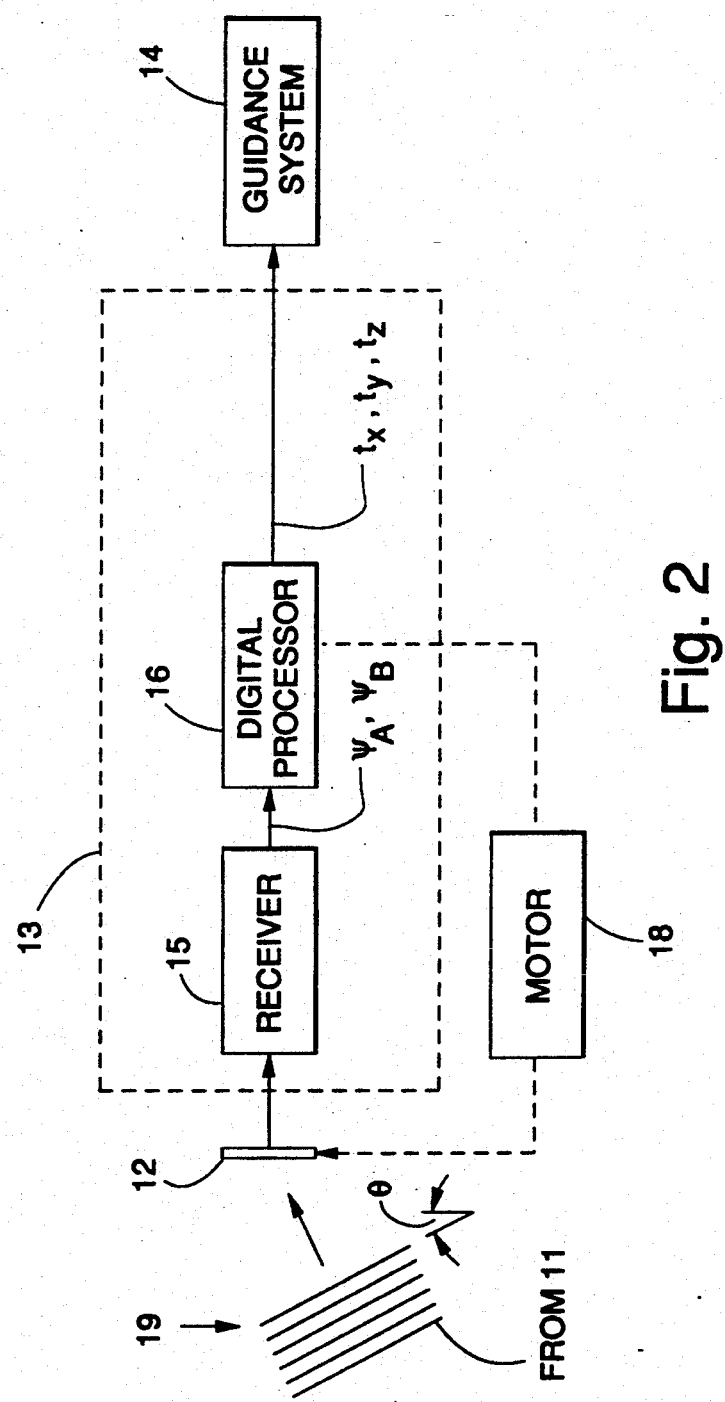
FIG. 2 shows details of the missile system of FIG. 1.

FIG. 2 shows the details of the missile system 10 of FIG. 1. The seeker 13 comprises a receiver 15 coupled to the output of the interferometer 12, and a digital signal processor 16 coupled to the output of the receiver 15. The digital signal processor 16 is adapted to process output signals $\Psi_A$, $\Psi_B$ from the receiver 15 derived from the phase differences between signals received from the four antenna interferometer 12. For the missile system 10, the digital signal processor 16 receives roll orientation measurements from the guidance system 14. For applications without an external source of rotation control, the digital signal processor 16 may be employed to control inputs to a motor 18 that would control the rotational position of the antenna elements of the interferometer 12. The digital signal processor 16 is adapted to provide the direction cosines $(t_x, t_y, t_z)$ that indicate the direction to the target radar 11 that are employed by the guidance system 14. The guidance system 14 provides output signals that guide the missile system 10.

Figure 3A:
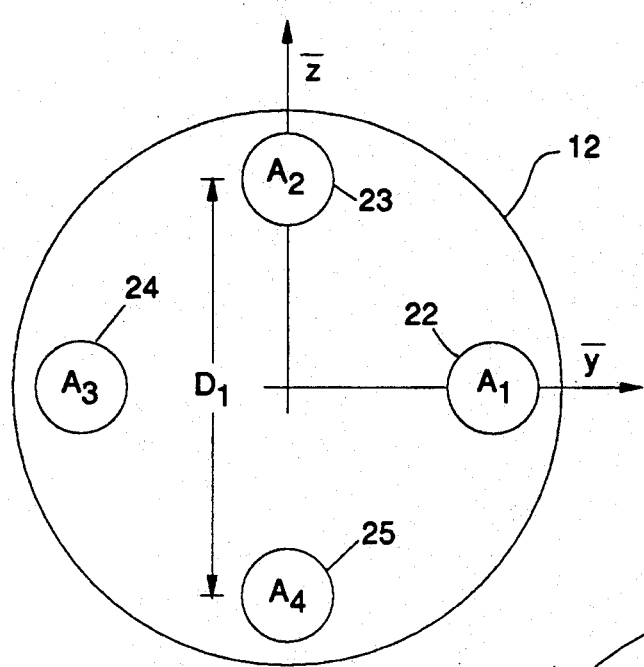
FIG. 3a shows a four antenna interferometer employed in the missile system of FIG. 1 that provides for maximum baseline.
Figure 3B:
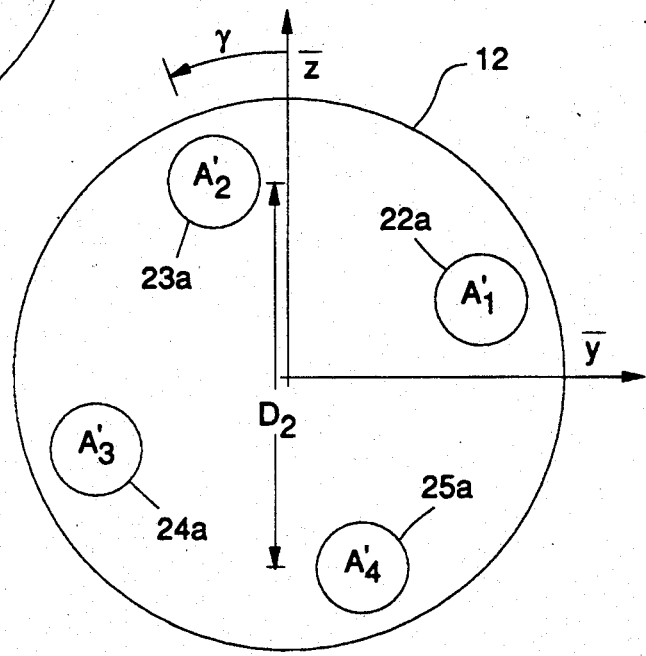
FIG. 3b shows how missile roll (or antenna rotation) changes the baseline orientation of the interferometer shown in FIG. 1, and in response to which the present invention is adapted to provide unambiguous angle data.

With reference to FIG. 3a, it shows a front surface of the four antenna interferometer 12 employed in the missile system 10 shown in FIG. 1. The interferometer 12 employs the four antennas 21, 22, 23, 24 to obtain angle data having maximum accuracy. This angle data is produced unambiguously and simultaneously in both azimuth and elevation directions using the principles of the present invention. The interferometer 12 provides for maximum baseline, the distance between the respective centers of opposed antenna pairs 21, 23 and 22, 24. FIG. 3b shows how missile roll (or rotation of the interferometer 12) changes the baseline orientation of the antennas 21, 22, 23, 24 and in response to which the present invention is adapted to provide unambiguous angle data. The missile roll ($\gamma$) (antenna/interferometer rotation) shown in FIG. 3b causes the four antennas 21, 22, 23, 24 to rotate in angular position with reference to the coordinate system $(\bar{x}, \bar{y}, \bar{z})$ shown in FIG. 3b ($\bar{x}$ is normal to the plane of the drawing).

The unambiguous computation of direction cosines $t_x$, $t_y$, $t_z$ to the target radar 11 achieved by the present invention may illustrated by the following example described with reference to FIGS. 3a and 3b. FIGS. 3a and 3b show the four antenna interferometer 12 at two different orientations, respectively. Orientation 1 (FIG. 3a) is denoted the zero roll position and orientation 2 (FIG. 3b) is denoted as having a roll angle of $\gamma$.

The positions of the antennas 21, 22, 23, 24 are defined in vector notation as:

| Initial | Final |
|---|---|
| $\overline{A1} = \frac{d}{2}\bar{y}$ | $\overline{A1'} = \frac{d}{2}(\cos\gamma\bar{y} + \sin\gamma\bar{z})$ |
| $\overline{A2} = \frac{d}{2}\bar{z}$ | $\overline{A2'} = \frac{d}{2}(-\sin\gamma\bar{y} - \cos\gamma\bar{z})$ |
| $\overline{A3} = \frac{d}{2}\bar{y}$ | $A3' = \frac{d}{2}(-\cos\gamma\bar{y} - \sin\gamma\bar{z})$ |
| $\overline{A4} = \frac{d}{2}\bar{z}$ | $\overline{A4'} = \frac{d}{2}(\sin\gamma\bar{y} - \cos\gamma\bar{z})$ | where $\bar{x}$, $\bar{y}$, $\bar{z}$ are orthonormal vectors. In these equations, A1, A2, A3, and A4 correspond to the antennas 21, 22, 23, 24, respectively. The position of the target radar 11 is defined by the unit vector: $\bar{T} = t_x\bar{x} + t_y\bar{y} + t_z\bar{z}$. The objective of the processing performed in the digital signal processor 16 in accordance with the present invention is to determine the three direction cosines $(t_x, t_y, t_z)$.

The phase of the signal received at each antenna 21, 22, 23, 24 (relative to the signal phase at the origin of the coordinate system defined by $\bar{x}$, $\bar{y}$, $\bar{z}$ is given by:

$$\frac{2\pi}{\lambda}(\overline{Ai} \cdot \bar{T})$$

where $\lambda$ is the wavelength of the received signal and $i = 1, 2, 3$, or 4. Consequently, the respective phases before and after antenna rotation is given by:

| Initial | Final |
|---|---|
| $\phi_1 = \frac{\pi d}{\lambda} t_y$ | $\phi_1' = \frac{\pi d}{\lambda}(t_y\cos\gamma + t_z\sin\gamma)$ |
| $\phi_2 = \frac{\pi d}{\lambda} t_z$ | $\phi_2' = \frac{\pi d}{\lambda}(-t_y\sin\gamma + t_z\cos\gamma)$ |
| $\phi_3 = -\frac{\pi d}{\lambda} t_y$ | $\phi_3' = \frac{\pi d}{\lambda}(-t_y\cos\gamma - t_z\sin\gamma)$ |
| $\phi_4 = -\frac{\pi d}{\lambda} t_z$ | $\phi_4' = \frac{\pi d}{\lambda}(t_y\sin\gamma - t_z\cos\gamma)$ |

Angle measurements generated by the receiver 15 (neglecting errors) are given by:

Initial
$$\psi_A = (\phi_1 - \phi_3) MOD\, 2\pi = \frac{2\pi d}{\lambda} t_y - 2\pi n_A \text{ and}$$

$$\psi_B = (\phi_2 - \phi_4) MOD\, 2\pi = \frac{2\pi d}{\lambda} t_z - 2\pi n_B$$

Final
$$\psi_A' = (\phi_1' - \phi_3') MOD\, 2\pi = \frac{2\pi d}{\lambda}(t_y\cos\gamma + t_z\sin\gamma) - 2\pi n_A'$$

-continued $$\psi_B' = (\phi_2' - \phi_4')MOD\ 2\pi = \frac{2\pi d}{\lambda}(-t_y\sin\gamma + t_z\cos\gamma) - 2\pi n_{B'}$$

where $n_A$, $n_B$, $n'_A$, $n'_B$ are integers defining the phase ambiguity cells into which the respective measurements fall. As can be seen from these equations, the phase ambiguity exists because the separation between the centers of the opposed antennas 22, 23, 24, 25 is greater than $(\frac{1}{2})\lambda$ and since spiral antenna elements are typically employed in the interferometer 12 to obtain a large bandwidth.

By constraining the rotation angle $\gamma$ to small values such that $$\left|\frac{2\pi d}{\lambda}(t_y\cos\gamma + t_z\sin\gamma) - \frac{2\pi d}{\lambda}t_y\right| < \pi \text{ and}$$

$$\left|\frac{2\pi d}{\lambda}(-t_y\sin\gamma + t_z\cos\gamma) - \frac{2\pi d}{\lambda}t_z\right| < \pi$$

the angle measurements may be modified for the final geometry such that they have the same ambiguity indices as the original measurements:

$$\psi_A'' = \psi_A' + 2\pi NINT\left(\frac{\psi_A - \psi_{A'}}{2\pi}\right) =$$

$$\frac{2\pi d}{\lambda}(t_y\cos\gamma + t_z\sin\gamma) - 2\pi n_A$$

$$\psi_B'' = \psi_B' + 2\pi NINT\left(\frac{\psi_B - \psi_{B'}}{2\pi}\right) =$$

$$\frac{2\pi d}{\lambda}(-t_y\sin\gamma + t_z\cos\gamma) - 2\pi n_B.$$

This constraint on the rotation angle $\gamma$ may be eliminated by taking additional phase measurements between the initial and final measurements at an update rate that is sufficient to limit the changes in phase resulting from rotation of the antenna array to less than 180° between updates. Each phase measurement may be modified such that it has the same ambiguity indices as the preceding measurement and thus the same ambiguity indices as the initial measurement, $n_A$, $n_B$, in the same manner as described above:

$$\psi_{A\ new}'' = \psi_{A\ new}' + 2\pi NINT\left(\frac{\psi_{A\ previous} - \psi_{A\ new}'}{2\pi}\right)$$

$$\psi_{B\ new}'' = \psi_{B\ new}' + 2\pi NINT\left(\frac{\psi_{B\ previous} - \psi_{B\ new}'}{2\pi}\right).$$

Combining the modified measurements for the final geometry with the angle measurements for the initial geometry, four linear equations in four unknowns are generated. Solving for $n_A$ and $n_B$ results in:

$$n_A = \begin{vmatrix} (2\pi d/\lambda) & 0 & \psi_A & 0 \\ 0 & (2\pi d/\lambda) & \psi_B & -2\pi \\ ((2\pi d/\lambda)\cos\gamma) & ((2\pi d/\lambda)\sin\gamma) & \psi_A'' & 0 \\ -((2\pi d/\lambda)\sin\gamma) & ((2\pi d/\lambda)\cos\gamma) & \psi_B'' & -2\pi \\ \hline (2\pi d/\lambda) & 0 & -2\pi & 0 \\ 0 & (2\pi d/\lambda) & 0 & -2\pi \\ ((2\pi d/\lambda)\cos\gamma) & ((2\pi d/\lambda)\sin\gamma) & -2\pi & 0 \\ -((2\pi d/\lambda)\sin\gamma) & ((2\pi d/\lambda)\cos\gamma) & 0 & -2\pi \end{vmatrix}$$

and thus $$n_A = NINT\left[-\frac{(\psi_A'' + \psi_A)/2}{2\pi} - \frac{(\psi_B'' - \psi_B)/2}{2\pi} \cdot \frac{\sin\gamma}{1 - \cos\gamma}\right], \text{ and}$$

$$n_B = \begin{vmatrix} (2\pi d/\lambda) & 0 & -2\pi & \psi_A \\ 0 & (2\pi d/\lambda) & 0 & \psi_B \\ ((2\pi d/\lambda)\cos\gamma) & ((2\pi d/\lambda)\sin\gamma) & -2\pi & \psi_A'' \\ -((2\pi d/\lambda)\sin\gamma) & ((2\pi d/\lambda)\cos\gamma) & 0 & \psi_B'' \\ \hline (2\pi d/\lambda) & 0 & -2\pi & 0 \\ 0 & (2\pi d/\lambda) & 0 & -2\pi \\ ((2\pi d/\lambda)\cos\gamma) & ((2\pi d/\lambda)\sin\gamma) & -2\pi & 0 \\ -((2\pi d/\lambda)\sin\gamma) & ((2\pi d/\lambda)\cos\gamma) & 0 & -2\pi \end{vmatrix}$$

and thus $$n_B = NINT\left[-\frac{(\psi_B'' + \psi_B)/2}{2\pi} + \frac{(\psi_A'' - \psi_A)/2}{2\pi} \cdot \frac{\sin\gamma}{1 - \cos\gamma}\right].$$

Since $n_A$ and $n_B$ are integers, the NINT (nearest integer) function is used above. This suppresses the effect of small phase measurement errors in solving for $n_A$ and $n_B$.

Consequently, the values for the three direction cosines $(t_x, t_y, t_z)$ are given by:

$$t_y = (\psi_A + 2\pi n_A)\frac{\lambda}{2\pi d}$$

$$t_z = (\psi_B + 2\pi n_B)\frac{\lambda}{2\pi d}$$

$$t_x = \sqrt{1 - t_y^2 - t_z^2}.$$

It may be noted that once the unambiguous bearing to the target radar 11 has been determined, all subsequent angle measurements may be unambiguously decoded without requiring additional rotation of the interferometer antenna array provided the measurement update rate is sufficient to limit changes in phase to less than 180° between updates.

Figure 4:
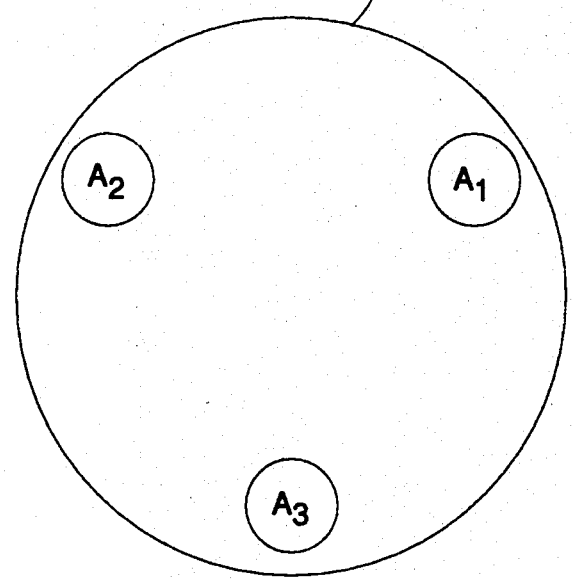
FIG. 4 shows an alternative three antenna embodiment of an interferometer that may be employed with the present invention.

FIG. 4 shows an alternative three antenna embodiment of an interferometer 12a that may be employed with the present invention. Three antennas 31, 32, 33 are shown disposed at each apex of an equilateral triangle on the surface of the interferometer 12a. The corresponding ambiguity resolution equations for the three antenna element interferometer 12a of FIG. 4 are as follows:

$$n_A = NINT\left[ -\frac{(\psi_A'' + \psi_A)/2}{2\pi} - \left(\frac{1}{\cos 30°}\right)\frac{(\psi_B'' - \psi_B)/2}{2\pi} - \left(\frac{1}{2}\right)\frac{(\psi_A'' - \psi_A)/2}{2\pi} \frac{1}{\tan\gamma/2} \right]$$

$$n_B = NINT\left[ -\frac{(\psi_B'' + \psi_B)/2}{2\pi} - \left(\frac{1}{\cos 30°}\right)\frac{(\psi_A'' - \psi_A)/2}{2\pi} - \left(\frac{1}{2}\right)\frac{(\psi_B'' - \psi_B)/2}{2\pi} \frac{1}{\tan\gamma/2} \right]$$

$$t_y = (\psi_A + 2\pi n_A)\frac{\lambda}{2\pi d}$$

$$t_z = (\psi_B + 2\pi n_B) - \frac{1}{2}(\psi_A + 2\pi n_A)\frac{1}{\cos 30°}\frac{\lambda}{2\pi d}$$

$$t_x = \sqrt{1 - t_y^2 - t_z^2}$$

The present invention is tolerant of phase measurement errors since only integers are acceptable for the ambiguity value. The present invention was tested with a four antenna interferometer behind a radome of a HARM missile system. The radome typically introduces phase errors on the order of 20° to 50°. The present invention was able to consistently resolve the ambiguities even with these phase errors.

Thus there has been described a new and improved apparatus and method for providing unambiguous angle measurements simultaneously in azimuth and elevation in such interferometers using a minimum number of antenna elements. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method for determining an unambiguous bearing to a target radar that radiates energy, said method comprising the steps of:

using a broadbeam phase interferometer comprising at least three antennas, to determine a first ambiguous target bearing in azimuth and elevation as a function of phase difference and frequency of received energy radiated energy from the target radar;

rotating the antennas by a known angular amount relative to a known coordinate system to orient them at a rotated angular position;

using the broadbeam phase interferometer, determining a second ambiguous target bearing in azimuth and elevation as a function of the phase difference and frequency of the received energy from the target radar at the rotated angular position; and processing the first and second ambiguous target bearings in accordance with a predetermined set of simultaneous equations to determine an unambiguous bearing to the target radar.

2. The method of claim 1 wherein the unambiguous bearing to the target radar is defined by three direction cosines $(t_x, t_y, t_z)$ that are given by:

$$t_y = (\psi_A + 2\pi n_A)\frac{\lambda}{2\pi d}, \quad t_z = (\psi_B + 2\pi n_B)\frac{\lambda}{2\pi d} \text{ and}$$

$$t_x = \sqrt{1 - t_y^2 - t_z^2},$$

where $\Psi_A$, $\Psi_B$ are the output signals from the receiver, $l$ is the wavelength of the energy radiated from the target radar, d is the baseline separation between antennas, and $n_A$ and $n_B$ are integers defining the phase ambiguity cells into which respective bearing measurements fall.

3. The method of claim 1 wherein $n_A$ and $n_B$ are given by:

$$n_A = NINT\left[ -\frac{(\psi_A'' + \psi_A)/2}{2\pi} - \frac{(\psi_B'' - \psi_B)/2}{2\pi} \cdot \frac{\sin\gamma}{1 - \cos\gamma} \right]$$

$$n_B = NINT\left[ -\frac{(\psi_B'' + \psi_B)/2}{2\pi} - \frac{(\psi_A'' - \psi_A)/2}{2\pi} \cdot \frac{\sin\gamma}{1 - \cos\gamma} \right]$$

where $\gamma$ is the angle through which the interferometer is rotated in determining the first an second ambiguous target bearings, $$\psi_A' = \frac{2\pi d}{\lambda}(t_y\cos\gamma + t_z\sin\gamma) - 2\pi n_A'$$

$$\psi_B' = \frac{2\pi d}{\lambda}(-t_y\sin\gamma + t_z\cos\gamma) - 2\pi n_B'$$

where $\Psi'_A$ and $\Psi'_B$ are the output signals from the receiver after the interferometer array has been rotated to the second orientation, and $$\psi_A'' = \psi_A' + 2\pi NINT\left(\frac{\psi_A - \psi_A'}{2\pi}\right) =$$

$$\frac{2\pi d}{\lambda}(t_y\cos\gamma + t_z\sin\gamma) - 2\pi n_A,$$

and $$\psi_B'' = \psi_B' + 2\pi NINT\left(\frac{\psi_B - \psi_B'}{2\pi}\right) =$$

$$\frac{2\pi d}{\lambda}(-t_y\sin\gamma + t_z\cos\gamma) - 2\pi n_B,$$

where $\psi_A''$ and $\psi_B''$ are derived from $\psi'_A$ and $\psi'_B$ so as to have the same ambiguity indices, $n_A$, $n_B$ as the first received output signals $\Psi_A$, $\Psi_B$.

4. Apparatus for determining an unambiguous bearing to a target radar that radiates energy, said method comprising the steps of:

a broadbeam phase interferometer comprising at least three antennas for monitoring radiated energy from the target radar;

a receiver for processing energy received by the broadbeam phase interferometer and providing output signals indicative of the relative phase of the received energy;

means for rotating the antennas of the broadbeam phase interferometer by a known angular amount relative to a known coordinate system to provide for first and second known orientations having nonrotated and rotated angular positions, respectively; and signal processing means for processing the output signals from the receiver and for determining a first ambiguous target bearing in azimuth and elevation as a function of phase difference and frequency of the received energy in response to output signals corresponding to the first orientation, for determining a second ambiguous target bearing in azimuth and elevation as a function of phase difference and frequency of the received energy in response to output signals corresponding to the second orientation, and for processing the first and second ambiguous target bearings in accordance with a predetermined set of simultaneous equations to determine an unambiguous bearing to the target radar.

5. The apparatus of claim 4 wherein the unambiguous bearing to the target radar is defined by three direction cosines $(t_x, t_y, t_z)$ that are given by:

$$t_y (\psi_A + 2\pi n_A) \frac{\lambda}{2\pi d}, \ t_z = (\psi_B + 2\pi n_B) \frac{\lambda}{2\pi d}, \text{ and}$$

$$t_x = \sqrt{1 - t_y^2 - t_z^2},$$

where $Y_A$, $Y_B$ are the output signals from the receiver, $\lambda$ is the wavelength of the energy radiated from the target radar, d is the baseline separation between antennas, and $n_A$ and $n_B$ are integers defining the phase ambiguity cells into which respective bearing measurements fall.

6. The apparatus of claim 4 wherein $n_A$ and $n_B$ are given by:

$$n_A = NINT\left[ -\frac{(\psi_A'' + \psi_A)/2}{2\pi} - \frac{(\psi_B'' - \psi_B)/2}{2\pi} \cdot \frac{\sin \gamma}{1 - \cos \gamma} \right]$$

$$n_B = NINT\left[ -\frac{(\psi_B'' + \psi_B)/2}{2\pi} - \frac{(\psi_A'' - \psi_A)/2}{2\pi} \cdot \frac{\sin \gamma}{1 - \cos \gamma} \right]$$

where $\gamma$ is the angle of rotation that achieves the the rotated angular position of the interferometer, $$\psi_A' = \frac{2\pi d}{\lambda} (t_y \cos \gamma + t_z \sin \gamma) - 2\pi n_A'$$

$$\psi_B' = \frac{2\pi d}{\lambda} (-t_y \sin \gamma + t_z \cos \gamma) - 2\pi n_B'$$

where $\psi'_A$ and $\psi'_B$ are the output signals from the receiver after the interferometer array has been rotated to the second orientation, and $$\psi_A'' = \psi_A' + 2\pi NINT\left(\frac{\psi_A - \psi_A'}{2\pi}\right) =$$

$$\frac{2\pi d}{\lambda} (t_y \cos \gamma + t_z \sin \gamma) - 2\pi n_A,$$

and $$\psi_B'' = \psi_B' + 2\pi NINT\left(\frac{\psi_B - \psi_B'}{2\pi}\right) =$$

$$\frac{2\pi d}{\lambda} (-t_y \sin \gamma + t_z \cos \gamma) - 2\pi n_B,$$

where $\psi_A$ and $\psi_B$ are derived from $\psi'_A$ and $\psi'_B$ so as to have the same ambiguity indices, $n_A$, $n_B$ as the first received output signals $\Psi_A$, $\Psi_B$.

7. A method of determine an unambiguous bearing to a target radar that radiates energy, said method comprising the steps of:

monitoring radiated energy from the target radar;

using an interferometer comprising at least three antennas, determining a first ambiguous target bearing as a function of phase difference and frequency of the received energy;

rotating the antennas by a known angular amount relative to a known coordinate system to orient them at a rotated angular position;

using the interferometer, determining a second ambiguous target bearing as a function of the phase difference and frequency of the received energy at the rotated angular position; and processing the first and second ambiguous target bearings in accordance with a predetermined set of simultaneous equations to determine an unambiguous bearing to the target radar, and wherein the unambiguous bearing to the target radar is defined by three direction cosines $(t_x, t_y, t_z)$ are given by:

$$t_y = (\psi_A + 2\pi n_A) \frac{\lambda}{2\pi d}, \ t_z = (\psi_B + 2\pi n_B) \frac{\lambda}{2\pi d}, \text{ and}$$

$$t_x = \sqrt{1 - t_y^2 - t_z^2},$$

where $Y_A$, $Y_B$ are the output signals from the receiver, $\gamma$ is the wavelength of the energy radiated from the target radar, d is the baseline separation between antennas, and $n_A$ and $n_B$ are integers defining the phase ambiguity cells into which respective bearing measurements fall.

8. The method of Claim 7 wherein $n_A$ and $n_B$ are given by:

$$n_A = NINT\left[ -\frac{(\psi_A'' + \psi_A)/2}{2\pi} - \frac{(\psi_B'' - \psi_B)/2}{2\pi} \cdot \frac{\sin \gamma}{1 - \cos \gamma} \right]$$

$$n_B = NINT\left[ -\frac{(\psi_B'' + \psi_B)/2}{2\pi} + \frac{(\psi_A'' - \psi_A)/2}{2\pi} \cdot \frac{\sin \gamma}{1 - \cos \gamma} \right]$$

where g is the angle through which the interferometer is rotated in determining the first an second ambiguous target bearings, $$\psi_A' = \frac{2\pi d}{\lambda} (t_y \cos \gamma + t_z \sin \gamma) - 2\pi n_A'$$

$$\psi_B' = \frac{2\pi d}{\lambda} (-t_y \sin \gamma + t_z \cos \gamma) - 2\pi n_B'$$

where $\psi'_A$ and $\psi'_B$ are the output signals from the receiver after the interferometer array has been rotated to the second orientation, and $$\psi_A'' = \psi_A' + 2\pi NINT\left(\frac{\psi_A - \psi_A'}{2\pi}\right) = \frac{2\pi d}{\lambda}(t_y\cos\gamma + t_z\sin\gamma) - 2\pi n_A,$$

and $$\psi_B'' = \psi_B' + 2\pi NINT\left(\frac{\psi_B - \psi_B'}{2\pi}\right) = \frac{2\pi d}{\lambda}(-t_y\sin\gamma + t_z\cos\gamma) - 2\pi n_B,$$

where $\psi_A$ and $\psi_B$ are derived from $\psi'_A$ and $\psi'_B$ so as to have the same ambiguity indices, $n_A$, $n_B$ as the first received output signals $Y_A$, $Y_B$.

9. Apparatus for determining an unambiguous bearing to a target radar that radiates energy, said method comprising the steps of:
   an interferometer comprising at least three antennas for monitoring radiated energy from the target radar;
   a receiver for processing energy received by the interferometer and providing output signals indicative of the relative phase of the received energy;
   means for rotating the antennas of the interferometer by a known angular amount relative to a known coordinate system to to provide for first and second known orientations having nonrotated and rotated angular positions, respectively; and
   signal processing means for processing the output signals from the receiver and for determining a first ambiguous target bearing as a function of phase difference and frequency of the received energy in response to output signals corresponding to the first orientation, for determining a second ambiguous target bearing as a function of phase difference and frequency of the received energy in response to output signals corresponding to the second orientation, and for processing the first and second ambiguous target bearings in accordance with a predetermined set of simultaneous equations to determine an unambiguous bearing to the target radar;
   and wherein the unambiguous bearing to the target radar is defined by three direction cosines $(t_x, t_y, t_z)$ that are given by:

$$t_y = (\psi_A + 2\pi n_A)\frac{\lambda}{2\pi d}, \quad t_z = (\psi_B + 2\pi n_B)\frac{\lambda}{2\pi d}, \text{ and}$$

$$t_x = \sqrt{1 - t_y^2 - t_z^2},$$

where $Y_A$, $Y_B$ are the output signals from the receiver, l is the wavelength of the energy radiated from the target radar, d is the baseline separation between antennas, and $n_A$ and $n_B$ are integers defining the phase ambiguity cells into which respective bearing measurements fall.

10. The apparatus of claim 9 wherein $n_A$ and $n_B$ are given by:

$$n_A = NINT\left[-\frac{(\psi_A'' + \psi_A)/2}{2\pi} - \frac{(\psi_B'' - \psi_B)/2}{2\pi} \cdot \frac{\sin\gamma}{1 - \cos\gamma}\right]$$

$$n_B = NINT\left[-\frac{(\psi_B'' + \psi_B)/2}{2\pi} - \frac{(\psi_A'' - \psi_A)/2}{2\pi} \cdot \frac{\sin\gamma}{1 - \cos\gamma}\right]$$

where g is the angle of rotation that achieves the the rotated angular position of the interferometer, $$\psi_A' = \frac{2\pi d}{\lambda}(t_y\cos\gamma + t_z\sin\gamma) - 2\pi n_A'$$

$$\psi_B' = \frac{2\pi d}{\lambda}(-t_y\sin\gamma + t_z\cos\gamma) - 2\pi n_B'$$

where $\psi'_A$ and $\psi'_B$ are the output signals from the receiver after the interferometer array has been rotated to the second orientation, and $$\psi_A'' = \psi_A' + 2\pi NINT\left(\frac{\psi_A - \psi_A'}{2\pi}\right) = \frac{2\pi d}{\lambda}(t_y\cos\gamma + t_z\sin\gamma) - 2\pi n_A,$$

and $$\psi_B'' = \psi_B' + 2\pi NINT\left(\frac{\psi_B - \psi_B'}{2\pi}\right) = \frac{2\pi d}{\lambda}(-t_y\sin\gamma + t_z\cos\gamma) - 2\pi n_B,$$

where $\psi_A$ and $\psi_B$ are derived from $\psi'_A$ and $\psi'_B$ so as to have the same ambiguity indices, $n_A$, $n_B$ as the first received output signals $Y_A$, $Y_B$.

* * * * *